June 17, 1941.　　A. D. JARDINE ET AL　　2,245,920
WELDING APPARATUS
Filed Sept. 5, 1939　　2 Sheets-Sheet 2
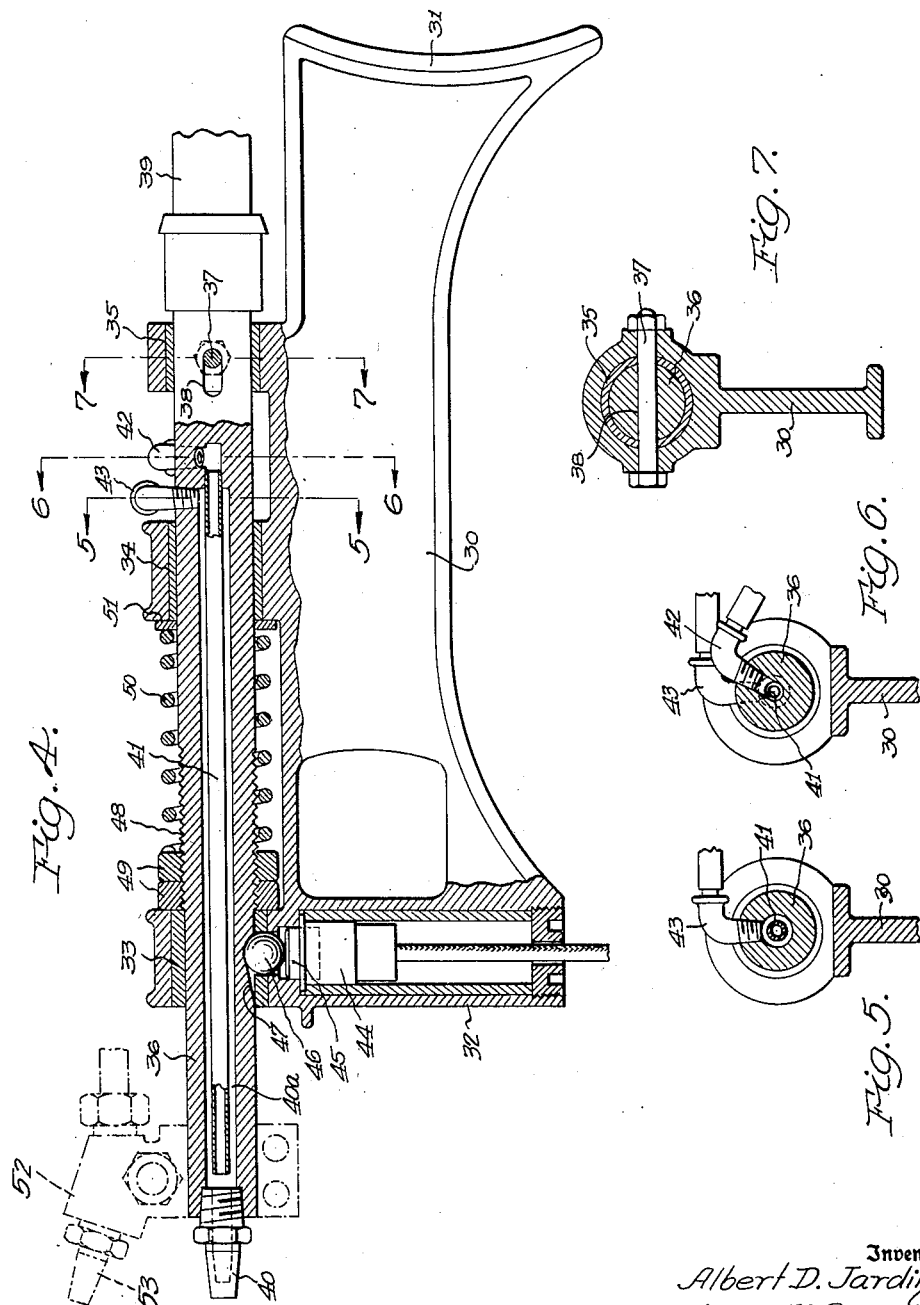
Inventors
Albert D. Jardine,
Harry V. Beronius,
By
Attorney Patented June 17, 1941

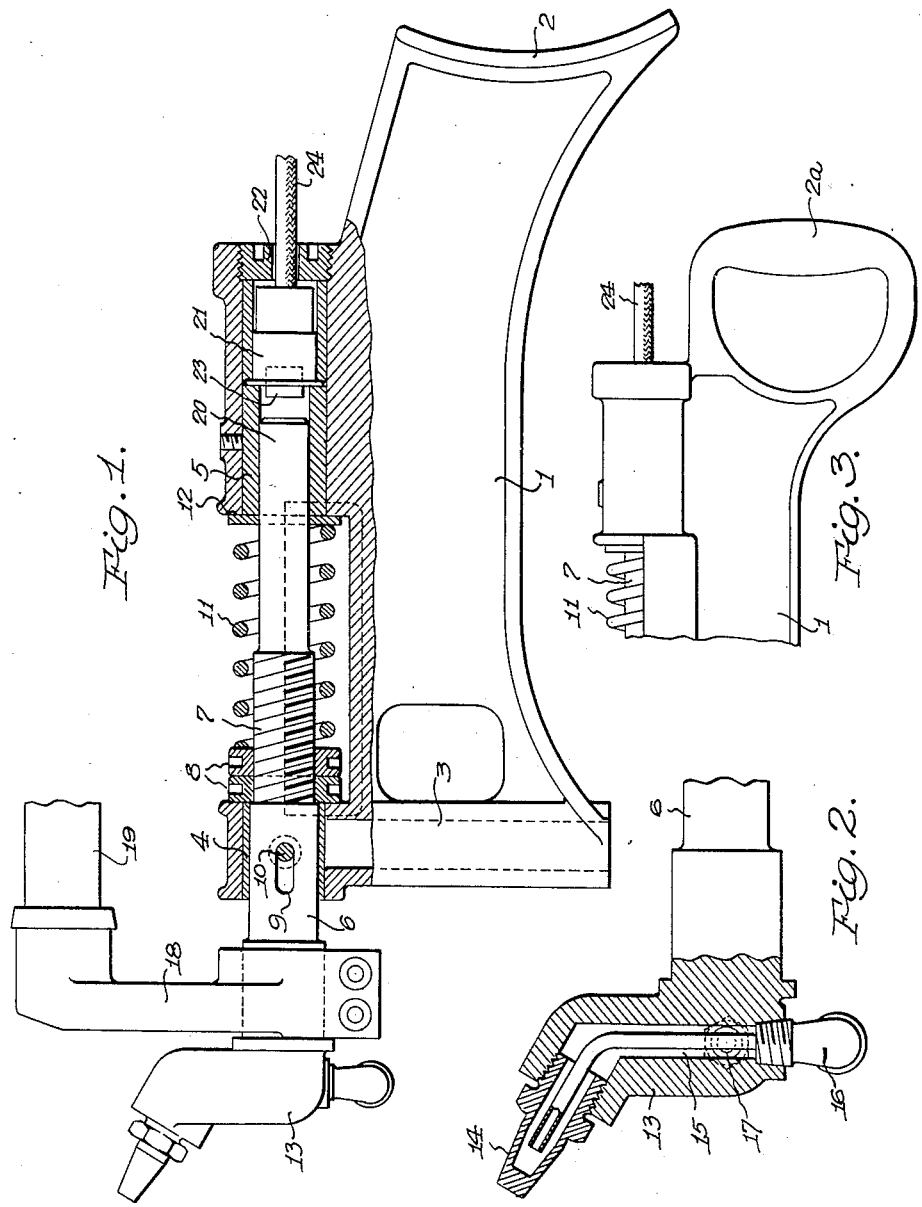

2,245,920

UNITED STATES PATENT OFFICE 2,245,920

WELDING APPARATUS

Albert D. Jardine and Harry V. Beronius, Detroit, Mich.

Application September 5, 1939, Serial No. 293,412

7 Claims. (Cl. 219—4)

The present invention relates to portable welding guns and has for its primary object to provide an electric welding gun wherein the act of applying pressure thereon controls the welding function. Ordinarily, guns of this character are provided with an anvil and a movable element movable in response to hydraulic pressure, both of which constitute electrodes. Control means is provided in such guns which functions when a predetermined pressure is built up on a work piece, interposed between the anvil and the movable electrode, to supply the welding current. The use of such guns is restricted, however, due to the fact that the work must reside between the anvil and the movable element at the time the weld takes place, whereas the present gun, as distinguished from the anvil type, employs no anvil and the pressure referred to for controlling the welding function is that caused by the operator in pressing the gun against the work.

Another object of the invention is to provide a portable, electric welding gun embodying means whereby an operator may conveniently handle the same to press the electrode into firm contact with parts to be welded, and in combination therewith, adjustable means which operates when a predetermined pressure has been applied on the electrode to supply the welding current. In other words, the gun is so constructed that the operator may place the same against his shoulder in order to conveniently apply pressure thereon. The controls which cause the weld to take place, function under a predetermined pressure, thus insuring the presence of the necessary pressure for efficient welding operations at the time the weld takes place. The controls are made adjustable in order that varying pressure requirements may be met.

Still another object of the invention is to provide a welding gun of the character above referred to wherein means is provided for removing the heat generated by welding operations.

With the above and other ends in view the invention is more fully disclosed with reference to the accompanying drawings, in which Figure 1 is an elevation, with parts thereof shown in section;

Fig. 2 is a fragmental section of a detail;

Fig. 3 is a fragmental elevation illustrating a modified handle arrangement;

Fig. 4 is a vertical section of a modified gun structure, and

Figs. 5, 6 and 7 are sections taken respectively on the lines 5—5, 6—6 and 7—7 of Fig. 4.

Like characters of reference are employed throughout to designate corresponding parts.

The numeral 1 designates the body which is provided with a shoulder rest 2 and a handle portion 3, in order that an operator may conveniently handle and apply pressure against the same. Slidably mounted in spaced bearings 4 and 5 is a push rod 6 having a screwthreaded portion 7 upon which nuts 8 are received. The push rod 6 is slotted at 9 and a pin 10, mounted in the body 1, extends through the slot 9 to restrict lengthwise movement of the push rod and also to prevent rotative movement thereof. A compressed coil spring 11 is sleeved on the push rod 6, between the nuts 8 and a shoulder 12 on the body 1 and normally urges movement of the push rod outwardly of the body 1.

The outer end of the push rod 6 has a head 13 thereon supporting a hollow electrode 14 in the end of a passage 15 therein. A fitting 16 is mounted in the other end of the passage 15 and has a tube 17 thereon which extends through the passage 15 and into the hollow electrode 14. The fitting 16 is adapted to be connected to a hose (not shown) through which a cooling liquid may be supplied thereto. When cooling liquid is supplied to the fitting 16 it is discharged into the hollow electrode 14 and flows through the passage 15 to an outlet 17. Liquid so circulated maintains the electrode 14 and the head 13 at a comparatively low temperature.

Mounted upon the push rod 6 is a cable lug 18 having a cable 19 connected thereto. It will be understood that the end of the cable 19, which is broken away, will be attached to one of the terminals of a secondary coil of a transformer for welding operations. Inasmuch as the power service devices for welding guns of this character are already known to those versed in this art, it has been deemed unnecessary to illustrate the same here.

Mounted in the body 1, adjacent the inner end 20 of the push rod 6, is an electric switch 21, held therein by a removable plug 22. The switch is of the type having a plunger 23, which closes a circuit when pushed inwardly. The lead-in wires 24, connected to the switch, extend to the control panel (not shown) of the power service device referred to above. Although the circuit is not shown here, it will be readily apparent to those versed in this art, that when the plunger 23 is pushed inwardly it closes a control circuit and operates the welding power service apparatus.

In operating the present gun, the cable 19 is connected to one of the terminals of the secondary coil (not shown) and the other terminal of the coil is connected to the work. The lead-in wires 24 are connected to the control panel (not shown) which controls the current which causes the welding function. The operator then presses the electrodes 4 against the part to be welded, and when sufficient pressure has been placed thereon to cause the spring 11 to yield, relative movement takes place between the push rod 6 and the body 1, with the result that the end 20 of the push rod pushes the plunger 23 inwardly and operates the switch 21. When the pressure is removed from the body 1 the spring 11 restores the parts to their original position.

From the foregoing it becomes apparent that the switch 21 cannot be operated until sufficient pressure has been applied on the electrode to cause compression of the spring 11. This function insures the presence of sufficient pressure for efficient welding operations at the time the weld takes place. The spring pressure may be varied by adjustably moving the nuts 8 to place the spring 11 under greater initial pressure.

With the body having the shoulder rest 2 above described the operator places the same against his shoulder and against the work part and then leans against the same. Such a mode of operation minimizes the actual physical effort required by the operator in supplying the necessary pressure on the gun. In cases where the shoulder rest is not practical, however, a hand grip 2a is substituted therefor, as shown by way of modification in Fig. 3.

In the device shown in Figs. 4 to 7, the numeral 30 designates a body formed with a shoulder rest 31 and a hand grip 32. In the upper part of the body 30, are spaced apart bearings 33, 34, and 35 which slidably support an elongated push rod 36. Lengthwise movement of the push rod 36 is restricted and rotative movement prevented by a pin 37, mounted in the body 30 adjacent the bearing 35, and extending through a slot 38 in the push rod. Connected to the rear end of the push rod 36 is a cable 39 which is adapted to be connected to one of the terminals of a secondary coil.

The push rod 36 has an axial bore 40a and an electrode 40 is mounted in the outer end of this bore. An elongate tube 41 is mounted in the bore 40 with one end in communication with a water supply port 42 and its other end disposed adjacent the electrode 41. In operation, cooling fluid is supplied through the port 42 and is conveyed by the tube 41 to the electrode 40 and returns through the bore 40a to an outlet port 43.

In the hand grip 32 is mounted an electric switch 44 having an actuating plunger 45 which when depressed closes the switch 44. Resting upon the plunger 45 is a ball 46 which is engaged by a cam surface 47 on the push rod 36. When the push rod 36 is moved relative to the body 30, in the direction permitted by the slot 38 and pin 37 as positioned in the showing of Fig. 4, the cam surface 47 depresses the ball 36 and causes the latter to push the plunger 45 downwardly to close the switch 44.

The push rod 36 has a screwthreaded portion 48 receiving nuts 49, and a coiled spring 50, sleeved on the push rod, is compressed between a shoulder 51, on the body 30, and the nuts 49.

With the parts of the device in the condition shown in Fig. 4, the electrode 40 is placed in contact with a work piece (not shown) and manual pressure is applied against the body 30.

When sufficient pressure is applied in this manner, the spring 50 yields and permits relative movement between the push rod 36 and the body 30. During this relative movement the cam surface 47 depresses the ball 46 and closes the switch 44. The switch 44 controls a power supply device which in turn supplies current through the cable 39 to the electrode 40, through the push rod 36.

For the purpose of placing the electrode in the meeting angles of irregularly shaped parts an adapter such as outlined in broken lines on Fig. 4 may be employed. The adapter is designated 52, carries an electrode 53, and is secured on the outer end of the push rod 36.

Although specific embodiments of the invention have been illustrated and described it will be understood that various changes may be made within the claims without departing from the spirit of the invention, and such changes are contemplated.

What we claim is:

1. In apparatus of the character described, a portable body having means for applying pressure thereon, a push rod slidable in said body, spring biasing means yieldably opposing relative movement between said push rod and body, an electrode mounted on said push rod, a switch mounted directly on said body and actuated by relative movement between said push rod and body and stop means for said push rod.

2. In apparatus of the character described, a portable body, a push rod slidable in said body, spring biasing means yieldably opposing relative movement between said push rod and body, a switch in said body, an actuator for said switch and arranged to be engaged by one end of said rod after a predetermined movement thereof relative to said body, and means for preventing further relative movement of said body and rod after said switch actuator has been moved.

3. In apparatus of the character described, a portable body having means for applying pressure thereon, a push rod slidable in said body, spring means yieldably opposing relative movement between said push rod and body, a switch in said body, an actuator for said switch, and cam means on said push rod for operating said actuator.

4. In apparatus of the character described, a portable body having means for applying pressure thereon, a push rod slidable in said body, spring biasing means yieldably opposing relative movement between said push rod and body, means for adjustably varying the pressure of said spring, a switch in said body, an actuator for said switch, cam means operably connecting said push rod and said actuator, and means for preventing further movement of said push rod relative to said body after said actuator has been operated.

5. Welding apparatus comprising, a body, a rod carried by said body, an electrode carried on one end of said rod, said body and said rod being relatively movable upon application of a force against said body to press said electrode against a surface of material to be welded, a switch carried by said body in alignment with the other end of said rod and actuated thereby upon relative movement between said body and said rod to close the circuit of the electrode, and yieldable means acting to move said rod relatively to said body to open the circuit of said electrode.

6. Welding apparatus comprising, an elongated supporting member having longitudinally spaced wall portions, said wall portions having a pair of bores axially aligning longitudinally of said supporting member, a switch unit in one of said bores, a tubular member in said one bore to limit movement of said switch unit, a reciprocal rod slidably guided in said other bore and in said tubular member, said rod carrying an electrode and being reciprocal to actuate said switch, and a helical coil spring surrounding said rod between said wall portions and acting to move said rod in one direction.

7. Welding apparatus comprising, an elongated supporting member having longitudinally spaced wall portions, said wall portions having a pair of bores axially aligning longitudinally of said supporting member, a switch unit in one of said bores, a tubular member in said one bore to limit movement of said switch unit, a reciprocal rod slidably guided in said other bore and in said tubular member, said rod carrying an electrode and being reciprocal to actuate said switch, a helical coil spring surrounding said rod between said wall portions and acting to move said rod in one direction, and means on said rod for adjusting the force exerted by said spring.

ALBERT D. JARDINE.
HARRY V. BERONIUS.